United States Patent
Cape et al.

(10) Patent No.: US 6,332,736 B1
(45) Date of Patent: Dec. 25, 2001

(54) METHOD AND APPARATUS FOR SPREADING PAVING MATERIALS

(75) Inventors: William R. Cape; Christopher C. Cape, both of Racine, WI (US)

(73) Assignee: James Cape and Sons Company, Racine, WI (US)

( * ) Notice: Subject to any disclaimer, the term of this patent is extended or adjusted under 35 U.S.C. 154(b) by 0 days.

(21) Appl. No.: 09/288,203

(22) Filed: Apr. 8, 1999

(51) Int. Cl.[7] .......................... E01C 19/12; B65G 21/10; B65G 41/00

(52) U.S. Cl. ...................... 404/75; 222/533; 198/312; 198/314; 198/317; 198/318; 404/101

(58) Field of Search ............................. 404/75, 101, 108, 404/105, 106; 222/533; 198/312, 314, 317, 318

(56) References Cited

U.S. PATENT DOCUMENTS

| | | |
|---|---|---|
| 301,044 | 6/1884 | Campbell . |
| 302,599 | 7/1884 | Stephan et al. . |
| 409,398 | 8/1889 | Gaumer . |
| 801,948 | 10/1905 | Whitcomb . |
| 1,090,418 | 3/1914 | Schneider . |
| 1,829,198 | 10/1931 | Speer . |
| 3,533,337 | * 10/1970 | Swisher, Jr. et al. ................. 404/108 |
| 3,540,359 | * 11/1970 | Swisher, Jr. et al. ................. 404/108 |
| 3,540,360 | * 11/1970 | Snow, Jr. et al. .................... 404/108 |
| 3,574,327 | 4/1971 | Golfi ......................................... 198/8 |
| 3,857,335 | 12/1974 | Wagley ................................... 100/73 |
| 3,970,405 | * 7/1976 | Swisher, Jr. et al. ................. 404/105 |
| 4,266,917 | 5/1981 | Godbersen ............................. 425/64 |

(List continued on next page.)

OTHER PUBLICATIONS

Rodriguez, Jim (Editor), Sackett, Bob (Contributing Editor), Treadwell, Karen (Production Editor), CMI Corporation News, Fall 1997, pp. 1–31.

CMI Corporation, "MTP–4004 Concrete Material Transfer Placer Specifications", CMI Corporation Publication, CMI–5877, 1997, pp. 1–4.

Rexworks, Inc., "Town and Country Placer–Spreader, Designed for High Volume Concrete Placement", Rex Paving Equipment Bulletin No. 2829–289, pp. 1–2.

(List continued on next page.)

Primary Examiner—Thomas B. Will
Assistant Examiner—Gary S. Hartmann
(74) Attorney, Agent, or Firm—Jenkens & Gilchrist, P.C.

(57) ABSTRACT

A method and apparatus for spreading paving materials. A chassis forms a support structure for the spreader and includes a front side facing toward a paving direction, a rear side opposite the front side, a receiving side facing toward a haul road and a far side opposite the receiving side. A receiving conveyor belt extends across the haul road and runs to a central point beneath the chassis, the receiving conveyor belt receives paving materials from delivery trucks traveling along the haul road and transports the paving materials to the central point where the paving materials fall off the receiving conveyor belt and onto a swinging delivery conveyor belt. The delivery conveyor belt includes a first end located at the central point beneath the receiving conveyor belt and extends beyond the rear side of the chassis to a second end of the receiving conveyor belt. The delivery conveyor belt receives paving materials falling off the receiving conveyor belt and transports the paving materials to the second end of the conveyor belt where the paving materials are spread behind the spreader. A swiveling mechanism effectuates the rotation of the first end of the delivery conveyor belt so as to swing the second end of the delivery conveyor belt behind the spreader. A delivery conveyor belt support structure supports the delivery conveyor belt frame from the swiveling mechanism and the chassis.

54 Claims, 4 Drawing Sheets

U.S. PATENT DOCUMENTS

| | | | |
|---|---|---|---|
| 4,789,266 | | 12/1988 | Clarke, Jr. et al. ........................ 404/96 |
| 4,813,526 | | 3/1989 | Bélanger ............................... 198/313 |
| 4,818,139 | | 4/1989 | Brock et al. ........................... 404/81 |
| 4,900,186 | | 2/1990 | Swisher, Jr. et al. ................... 404/105 |
| 5,069,578 | * | 12/1991 | Bense et al. ........................... 404/75 |
| 5,178,253 | * | 1/1993 | Fix ..................................... 198/317 |
| 5,232,305 | | 8/1993 | Bassett et al. ......................... 404/101 |
| 5,405,212 | * | 4/1995 | Swisher, Jr. et al. ................... 404/74 |
| 5,452,966 | * | 9/1995 | Swisher, Jr. ........................... 404/72 |
| 5,553,968 | * | 9/1996 | Campbell .............................. 404/108 |
| 5,590,977 | | 1/1997 | Guntert et al. ........................ 404/101 |
| 5,615,972 | | 4/1997 | Guntert et al. ........................ 404/72 |
| 5,819,950 | | 10/1998 | McCloskey ............................ 209/241 |
| 6,135,671 | * | 10/2000 | Yasu et al. ............................ 404/108 |

OTHER PUBLICATIONS

GOMACO Corporation, "PS–60 Placer Spreader", GOMACO Corporation Publication, Order No. 0415–0A10126, 1991, pp. 1–3.

GOMACO Corporation, "Computerized Transition Adjuster; New Computer Controlled Transition Adjuster for Smooth Transition", GOMACO Corporation Publication, Order No. 0320–0A10316, 1991, pp. 1–2.

Photograph A—Showing a Spreader (Sep. 1971).

Photograph B—Showing a Concrete Paving Machine (undated).

Photograph C—Showing a Concrete Paving Process (undated).

Photograph D—Showing a Concrete Paving Process (undated).

Photograph E—Showing a Concrete Spreading Process (undated).

Photograph F—Showing Concrete Spreading (undated).

Photograph G—Showing a Spreading Machine (undated).

Photograph H—Side View of a Machine (undated).

Photograph I—Showing a Spreading Machine (undated).

Photograph J—Showing a Arm of a Machine (undated).

\* cited by examiner

METHOD AND APPARATUS FOR SPREADING PAVING MATERIALS

FIELD OF THE INVENTION

The present invention pertains in general to techniques for spreading paving materials across an area to be paved, and in particular, but not by way of limitation, to a method and apparatus for depositing paving materials onto a receiving conveyor belt along a receiving side a paving material spreader and depositing the paving materials onto a prepared roadbed using a swinging delivery conveyor belt.

BACKGROUND OF THE INVENTION

Spreaders are used to spread a variety of paving materials including, but not limited to, sand, asphalt and concrete across a roadbed or other area to be paved. When concrete is used as the paving material, the spreader receives the concrete from delivery trucks which transport the concrete to the paving site and spreads the concrete across the roadbed or other area to be paved as it slowly travels in a direction of paving. Following behind the spreader is a paver which vibrates, extrudes, consolidates and otherwise finishes the concrete which has been spread out across the roadbed by the spreader. The spreader maintains height and directional alignment using a sting line which is placed along the area to be paved at a fixed alignment which defines the elevation and direction of the desired paved surface.

Several components are common to all spreaders and include, but are not limited to, such items as a rectilinear chassis which supports various components of the spreader, two or four tracks depending upon the spreader design for propelling the spreader, conveyor belts for receiving the paving material from delivery trucks and delivering the paving material to a prepared roadbed, hoppers for receiving and funneling the paving material deposited by the delivery trucks onto the conveyor belts, a control panel and instrumentation for controlling operation of the spreader, a power engine for providing power to the spreader, a drive train and power transmission system for transmitting power from the power engine to the conveyor belts and other spreader components, and a hydraulic system for controlling the movement of the various components.

Spreaders are designed to travel either over a prepared roadbed or alongside the prepared roadbed on a haul road which is also used by delivery trucks to deliver the paving material to the spreader and by other construction equipment traveling around the paving project. Current spreaders which travel over the prepared roadbed incorporate a swinging "drawbridge" conveyor belt which extends from beneath the spreader chassis, out past a side of the spreader adjacent to the haul road, and out over the haul road. The conveyor belt swings to an upright position to allow delivery trucks to pass by the conveyor belt on the haul road and then swings down once a delivery truck has passed the conveyor belt. The delivery truck deposits the paving material onto the conveyor belt which transports the paving material beneath the spreader chassis where the paving material falls onto the prepared roadbed to form a mound. As the spreader travels in the paving direction, a rotating auger and a strike plate spread the paving material laterally toward the sides of the spreader thereby distributing the paving material across the width of the prepared roadbed leaving an area of deposited paving material.

Spreaders which travel over the prepared roadbed have an advantage over other spreaders in that they allow delivery trucks, and normal traffic in situations where the haul road is an existing road, to travel unobstructed along the haul road. These spreaders, however, have drawbacks specific to their design. First, the rotating auger is continually moving through abrasive paving materials as it spreads them across the prepared roadbed causing the auger to wear thereby necessitating relatively frequent replacements. Second, while the chassis of the spreader can be "telescoped" in and out to vary the width of the spreader, the auger and a strike plate are fixed and require substantial time, effort and cost to replace them with an appropriate sized replacement. Third, in the event that insufficient paving material is deposited beneath the spreader as the spreader travels in the paving direction, a shortage of paving material results with no means for spreading additional paving material in the deficient area. Lastly, the elevation of the conveyor belt is fixed relative to the chassis such that the spreader cannot be used for paving projects where there is a large difference between the elevation of the haul road and the prepared roadbed, which in the case of a reconstruction project or where a paved surface is being widened, can be as much a four feet or more.

Spreaders which travel along the haul road overcome the drawbacks of spreaders which travel over the prepared roadbed. Currently two types of spreaders which travel along the haul road exist. Both types incorporate swinging conveyor belts which have distinctly different placements and orientations with respect to the chassis as compared to "drawbridge" conveyor belts previously discussed. Instead of extending out over the haul road to receive paving materials and depositing them beneath the spreader, conveyor belts on these spreaders receive the paving material from delivery trucks which deposit the paving material either directly on top of the spreader or in a hopper in front of the spreader. The conveyor belts begin either beneath the spreader or in front of the spreader and extend out the side of the spreader or out the back of the spreader respectively. Both conveyor belts have the ability to swing back and forth across the prepared roadbed as the spreader moves in the paving direction thereby spreading the paving material across the prepared roadbed and eliminating the need for an auger and strike plate.

Since these spreaders travel on the haul road and drop the paving material from the swinging conveyor belt which are suspended over the prepared roadbed, they can accommodate wide variations between the prepared roadbed and the haul road. Furthermore, in the event that insufficient paving material is deposited on the prepared roadbed, the conveyor belt can be swung around to deposit additional paving material onto the deficient area. In the event that the conveyor belt can no longer reach the deficient area due to the spreader having traveled in the paving direction, the spreader can back up to reach the deficient area.

In a first type of spreader which travels on the haul road, the conveyor belt extends from beneath the chassis, out past the side of the spreader which is adjacent to the prepared roadbed, and over the prepared roadbed. As delivery trucks arrive at the spreader, they travel up a first ramp and onto the spreader where they deposit the paving material through an opening in the chassis and onto the conveyor belt. After depositing the paving material, the delivery trucks continue to travel in a forward direction down a second ramp and off the spreader. While this type of spreader overcomes the drawbacks of spreaders which travel over the prepared roadbed they create a different set of drawbacks. In addition to obstructing the haul road to normal traffic and construction equipment, these spreaders are extremely long, typically one hundred and twenty feet, and overly wide, typically sixteen feet, thereby making their transport expensive and cumbersome.

A second type of spreader which travels over the haul road incorporates a hopper attached to a front side of the spreader facing the paving direction. A first conveyor belt transports paving material, which has been deposited into the hopper by the delivery trucks, to a second conveyor belt at a rear side of the spreader. The second conveyor belt extends from the rear side of the spreader and swings out across the prepared roadbed. This type of spreader also overcomes the drawbacks of spreaders which travel over the prepared roadbed, however, this type of spreader requires at least a double width haul road in order to allow delivery trucks to travel around the spreader, deposit the paving material into the hopper, and depart from the spreader without obstructing other arriving delivery trucks.

To transport current spreaders from one paving site to another paving site, the spreaders are typically loaded onto a trailer and transported between sites. Loading the spreader onto the trailer requires that the main chassis of the spreader be raised off the ground, typically using hydraulic rams attached to the chassis, backing the trailer under the spreader and lowering the spreader onto the trailer. Although this approach is effective, it is cumbersome.

It would be advantageous, therefore, to devise a method and apparatus for spreading paving material across a prepared roadbed wherein a spreader travels over the prepared roadbed so that the haul road remains unobstructed. It would further be advantageous if such a method and apparatus eliminated the need for a rotating auger and strike plate and could accommodate wide differences between the elevation of the haul road and the elevation of the prepared roadbed. It would still further be advantageous if such a method and apparatus provided a method for depositing additional paving material in areas where the paving material has been deposited in an insufficient amount. It would yet further be advantageous if such an apparatus could be driven under its own power onto a trailer for transport between paving sites.

SUMMARY OF THE INVENTION

The present invention comprises a method and apparatus for spreading paving materials. A chassis forms a support structure for the spreader and includes a front side facing toward a paving direction, a rear side opposite the front side, a receiving side facing toward a haul road and a far side opposite the receiving side. A receiving conveyor belt extends across the haul road and runs to a central point beneath the chassis, the receiving conveyor belt receives paving materials from delivery trucks traveling along the haul road and transports the paving materials to the central point where the paving materials fall off the receiving conveyor belt and onto a swinging delivery conveyor belt.

The delivery conveyor belt includes a first end located at the central point beneath the receiving conveyor belt and extends beyond the rear side of the chassis to a second end of the receiving conveyor belt. The delivery conveyor belt receives paving materials falling off the receiving conveyor belt and transports the paving materials to the second end of the conveyor belt where the paving materials are spread behind the spreader.

A swiveling mechanism effectuates the rotation of the first end of the delivery conveyor belt so as to swing the second end of the delivery conveyor belt behind the spreader. A delivery conveyor belt support structure supports the delivery conveyor belt frame from the swiveling mechanism and the chassis.

BRIEF DESCRIPTION OF THE DRAWINGS

A more complete understanding of the present invention may be had by reference to the following Detailed Description and appended claims, when taken in conjunction with the accompanying Drawings wherein:

DETAILED DESCRIPTION

Figure 1:
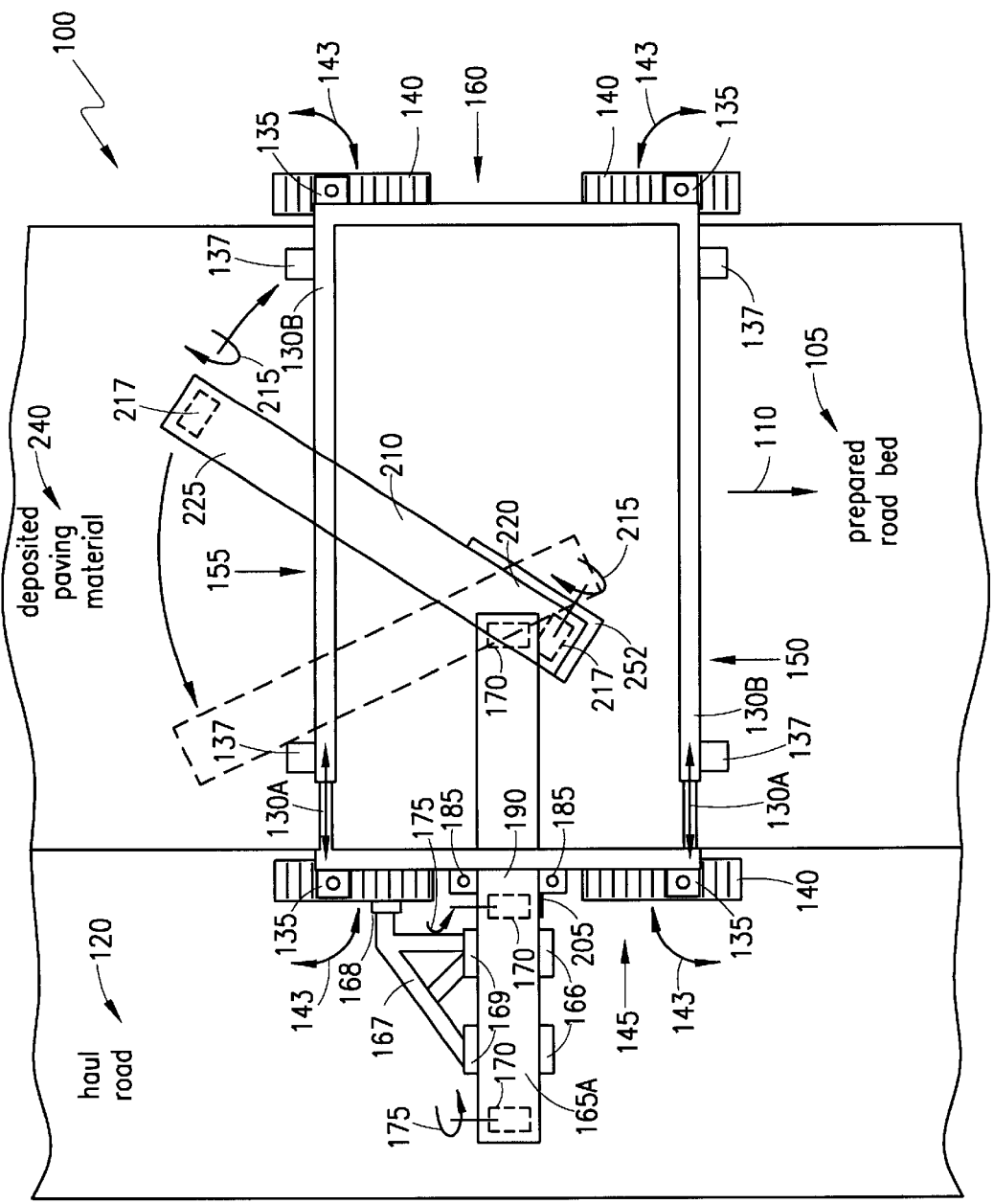
FIG. 1 is a top perspective of a schematic representation of the present invention.
Figure 2:
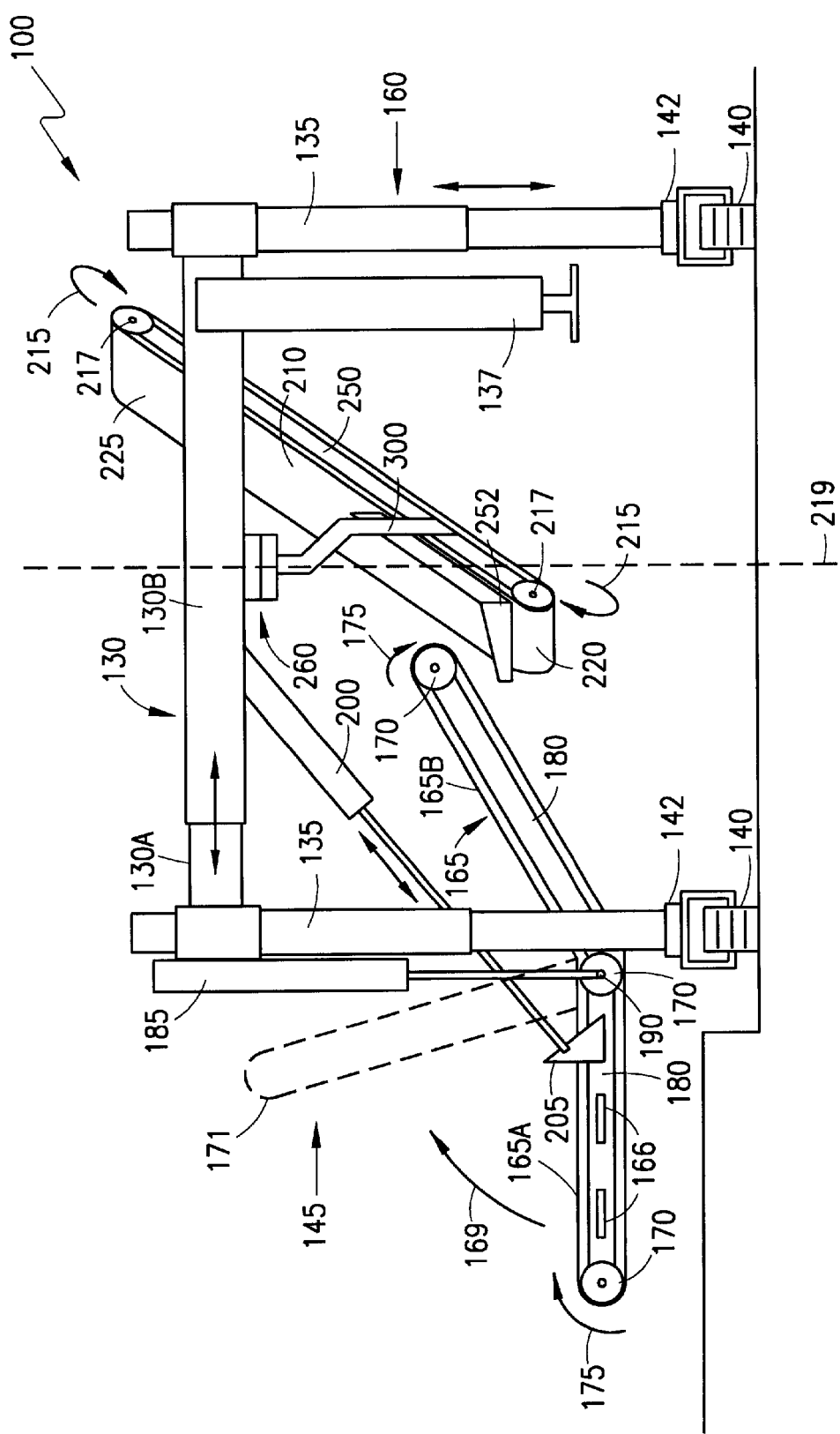
FIG. 2 is a frontal perspective of a schematic representation of the present invention.

Referring now to FIGS. 1 and 2, there is respectively illustrated a top perspective and a frontal perspective of a schematic representation of the present invention. A spreader, shown generally at 100, travels along a prepared roadbed 105 in a direction indicated by arrow 110. As the spreader 100 travels along the prepared roadbed 105, paving material is delivered to the spreader 100 by delivery trucks traveling along a haul road 120. When the paving project involves new construction, the haul road 120 is typically a dirt or gravel road which has been constructed alongside the prepared roadbed 105 and is generally at the same elevation as the prepared roadbed 105. In situations where the paving project involves the reconstruction or widening of an existing paved surface, the haul road 120 may either be paved or unpaved but is typically at a different elevation than the prepared roadbed 105 and can vary by as much as four feet or more. Furthermore, in situations where the existing roadway is being reconstructed or widened, the haul road 120 is frequently a functioning traffic lane of an existing roadway which may or may not continue to carry normal traffic during the paving project.

The spreader 100, includes a first portion 130A and a second portion 130B of a telescoping rectilinear chassis (collectively referred to as 130) which travels over the paving project and is used as a mainframe for suspending, affixing and generally supporting various components and systems which comprise the spreader 100. The first portion 130A and the second portion 130B telescope with respect to each other so that the width of the chassis 130 can be easily adjusted in accordance with a desired width of the paved surface.

In addition to the first portion 130A and the second portion 130B, the chassis 130 further includes various structural members and a platform which support various spreader components which are not shown for purposes of clarity. The chassis 130 further includes support cylinders 135 having large hydraulic pistons, located at each corner of the chassis 130. The support cylinders 135 operate in conjunction with a hydraulic system (not shown) and a control panel (not shown) to raise and lower the spreader 100 with respect to the prepared roadbed 105. The spreader 100 still further includes four hydraulic rams 137 (not all of the hydraulic rams 137 are shown in FIG. 2 for purposes of clarity) which are used to raise the chassis 130 off the ground.

Each of the four support cylinders 135 are attached to one of four separate tracks 140 mounted on track frames via four track swiveling mechanisms 142. The four tracks 140 are used to propel the spreader 100 both forward, in the paving direction as indicated by arrow 110, and backward, in a direction opposite to arrow 110. Using the track swiveling mechanisms 142, each of the four tracks 140 can be swiveled up to ninety degrees, as shown by arrows 143, between a forward facing direction and a side facing direction thereby allowing the spreader 100 to also travel left and right in a direction perpendicular to the paving direction.

While the present invention is depicted as having four tracks 140, in an alternative embodiment, the two support cylinders 135 on a receiving side 145 of the spreader 100 are attached to a first track without the use of a track swiveling mechanism. The first track of this embodiment, spans the distance from a front side 150 of the spreader 100 to a rear side 155 of the spreader 100. Similarly, the two support cylinders 135 on a far side 160 of the spreader 100 are attached to a second track without the use of a track swiveling mechanism and the second track also spans the distance from the front side 150 of the spreader 100 to the rear side 155 of the spreader 100. In this embodiment, the spreader 100 obviously cannot move in a left to right direction.

A receiving conveyor belt 165, comprising a first portion 165A and a second portion 165B, rotates about plurality of rotating drums 170 which rotate in a direction indicated by arrows 175. The rotating drums 170 are mounted to a receiving conveyor belt frame 180 which supports the rotating drums 170 and the receiving conveyor belt 165. The receiving conveyor belt frame 180 is attached to the chassis 130 in a manner well known in the industry and is not shown for purposes of clarity.

The receiving conveyor belt frame 180 is attached to a pair of receiving conveyor belt elevation pistons 185 at a transition point 190. The pair of receiving conveyor belt elevation pistons 185 are attached to the chassis 130 and are used to adjust the elevation of the receiving conveyor belt 165 with respect to the haul road 120. While the preferred embodiment uses a pair of receiving conveyor belt elevation pistons 185, it is understood that any number of pistons may be used.

The first portion 165A of the receiving conveyor belt 165 is horizontal and parallel to the haul road 120 and extends outward away from the chassis 130 beginning at the transition point 190 located outside the chassis 130 on a receiving side 145 of the spreader 100. Delivery trucks carrying the paving materials to the spreader 100 are driven into a position in front of the first portion 165A of the receiving conveyor belt 165 and deposit the paving material onto the receiving conveyor belt 165. When positioned in front of the first portion 165A of the receiving conveyor belt 165, the rear wheels of the delivery truck rest against a pair of rollers 166 attached to a front side of the receiving conveyor belt frame 180 and the spreader 100 pushes the delivery truck forward as the spreader 100 moves in the direction of paving 110. The rollers 166 rotate with the delivery truck tires as the spreader 100 pushes the delivery truck forward. While the preferred embodiment uses a pair of rollers 166, it is understood that any number of rollers may be used.

As the delivery truck is pushed forward by the spreader 100, a torsional force is exerted against the receiving conveyor belt frame 180. To transfer this force to the chassis 130, an angle brace 167 is attached to a rear side of the receiving conveyor belt frame 180 using two hinges 169. The hinges allow the angle brace 167 to be raised to an upright position so as to allow the nearby track swinging mechanism 142 to rotate the nearby track 140. The angle brace 167 makes contact with the nearby track frame 140 via a roller 168 attached to the angle brace 167. The roller 168 effectuates easy movement of the angle brace 167 against the track frame 140 as the receiving conveyor belt 165 is raised and lowered. In an alternative embodiment, the and roller 168 makes contact directly with the chassis 130 and not the nearby track frame 140. Furthermore, while the preferred embodiment uses a pair of two hinges 169, it is understood that any number of hinges may be used.

The second portion 165B of the receiving conveyor belt 165 extends at an incline from the transition point 190 to a centrally located point beneath the chassis 130. A hydraulic piston 200 (not shown in FIG. 1), is attached to the chassis 130 at a first end and is attached to an angle iron 205 at a second end. The angle iron 205 is in turn attached to the receiving conveyor belt frame 180. The hydraulic piston 200 effectuates movement of the first portion 165A of the receiving conveyor belt 165 such that the first portion 165A of the receiving conveyor belt 165 swings about the transition point 190 between the horizontal position and an upright position as depicted by arrow 169.

As a delivery truck, typically a dump trunk, arrives at the spreader 100, an operator engages the hydraulic piston 200 to raise the first portion 165A of the receiving conveyor belt 165 together with the angle brace 167 to the upright position as depicted by dashed line 171. With the first portion 165A of the receiving conveyor belt 165 in the upright position, the haul road 120 is unobstructed by the first portion 165A of the receiving conveyor bell 165 and the arriving delivery truck is able to travel past the upright first portion 165A of the receiving conveyor belt 165. After the delivery truck has traveled past the first portion 165A of the receiving conveyor belt 165, the operator releases the hydraulic piston 200 to lower the first portion 165A of the receiving conveyor belt 165 thereby allowing the delivery truck to deposit (dump) the paving material onto the first portion 165A of the receiving conveyor belt 165 as the spreader 100 pushes the delivery truck forward. Depending on the height of the delivery truck and the elevation of the haul road 120, the receiving conveyor belt 165 can be raised or lowered using the receiving conveyor belt elevation pistons 185.

Since the first portion 165A of the receiving conveyor belt 165 can be swung to an upright position, the delivery trucks do not need to drive around the first portion 165A of the receiving conveyor belt 165 and back up to the first portion 165A of the receiving conveyor belt 165 thus, the haul road 120 only needs to be as wide as the delivery trucks and is unobstructed to other construction equipment. Furthermore, in situations where the haul road 120 is a functioning roadway, the ability of the first portion 165A of the receiving conveyor belt 165 to swing to the upright position allows normal traffic to travel down the haul road 120 if required. Still further, if the haul road 120 is a functioning roadway with multiple lanes of traffic, only a single lane of traffic needs to be closed to normal traffic for use by the delivery trucks and eliminates the need for the delivery trucks to use additional lanes of traffic to get around the receiving conveyor belt 165.

After the paving material is delivered to the spreader 100 and deposited onto the first portion 165A of the receiving conveyor belt 165, the paving material moves with the rotating receiving conveyor belt 165 to the second portion 165B of the receiving conveyor belt 165 and up the incline of the second portion 165B of the receiving conveyor belt 165 to the centrally located point beneath the chassis 130 where the paving material falls off the second portion 165B of the receiving conveyor belt 165 and onto a delivery conveyor belt 210.

The delivery conveyor belt 210 is inclined and begins at a lower end 220 of the delivery conveyor belt 210 located at the centrally located point beneath both the chassis 130 and the receiving conveyor belt 165 and extends out past the rear side 155 of the chassis 130 to a raised end 225 of the delivery conveyor belt 210. The delivery conveyor belt 210 rotates on drums 217 in the direction of arrows 215. The delivery conveyor belt 210 also swings about a vertical axis 219 positioned at the centrally located point and running through the lower end 220 of the delivery conveyor belt 210 thereby allowing the raised end 225 of the delivery conveyor belt 210 to swing in a horizontal direction above an area where the prepared roadbed 105 transitions into a deposited paving material area 240.

The drums 217 are mounted to a delivery conveyor belt frame 250 which in turn, is mounted to a delivery conveyor belt swiveling mechanism 260 by a delivery conveyor belt arm 300. The delivery conveyor belt swiveling mechanism 260 is attached to the chassis 130 and in addition to supporting the delivery conveyor belt frame 250, the belt swiveling mechanism 260 effectuates the swinging of the delivery conveyor belt 210 about the vertical axis 219 positioned the centrally located point beneath the chassis 130. In an alternative embodiment, the delivery conveyor belt frame 250 may additionally be supported by one or more booms (not shown) at various points along the delivery conveyor belt 210. In the alternative embodiment, the booms are rotatable attached to the chassis 130.

After falling off the second portion 165B of the receiving conveyor belt 160, the paving material falls onto the lower end 220 of the delivery conveyor belt 210 which transports the paving material to the raised end 225 of the delivery conveyor belt 210. Attached to the delivery conveyor belt frame 250 is a splash guard/hopper 252 which prevents the falling paving material from spilling off the lower end 220 of the delivery conveyor belt 210. In an alternative embodiment, a chute structure is attached to the receiving conveyor belt frame 180 to direct the paving material onto the delivery conveyor belt 210.

When the paving material reaches the raised end 225 of the delivery conveyor belt 210, it falls off the delivery conveyor belt 210 and onto the prepared roadbed 105. An operator activates hydraulic controls which causes the swiveling mechanism 260 to swing the delivery conveyor belt 210 in the desired direction. Thus, as the paving material falls off the swinging raised end 225 of delivery conveyor belt 210, an arc of paving material is spread across the width of the prepared roadbed 105. Furthermore, as the raised end 225 of the delivery conveyor belt swings back and forth across the width of the prepared roadbed 105 and the spreader 100 travels in the paving direction 110, as indicated by arrow 110, the deposited paving material area 240 is formed.

While the spreader 100 normally travels in the paving direction as indicated by arrow 110, the spreader 100 is capable of traveling in the opposite direction in order that the raised end 225 of the delivery conveyor belt 210 can be moved into position above areas of deposited paving material 240 where there is insufficient paving material in order to deposit additional paving material.

Figure 3B:
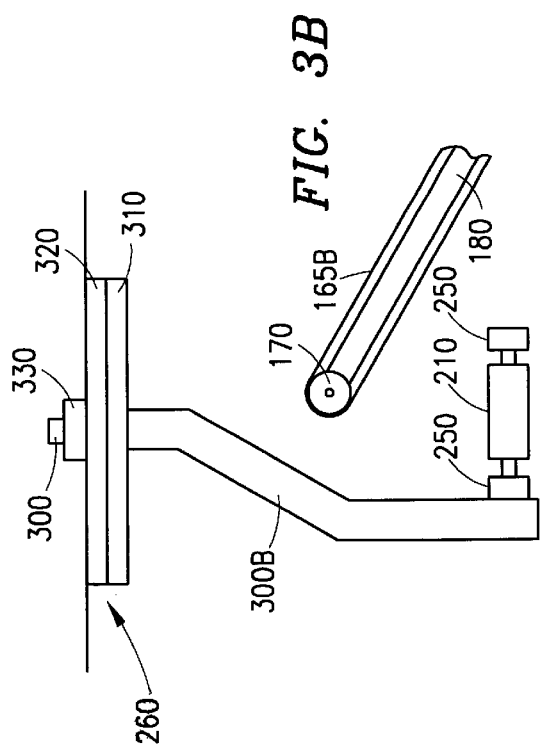
FIG. 3B is a frontal perspective of a second embodiment of the delivery conveyor belt arm and the delivery conveyor belt swiveling mechanism.
Figure 3A:
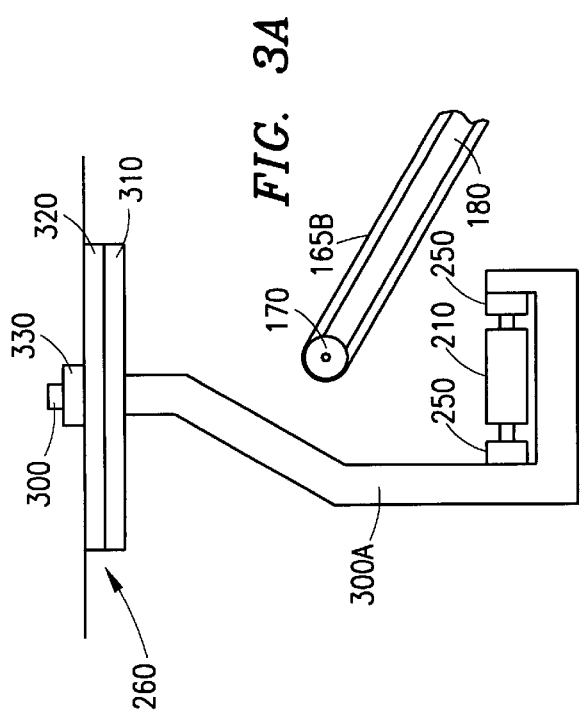
FIG. 3A is a frontal perspective of a first embodiment of a delivery conveyor belt arm and a delivery conveyor belt swiveling mechanism.

Referring additionally now to FIG. 3A, there is illustrated a frontal perspective of a first embodiment of the delivery conveyor belt arm 300A and the delivery conveyor belt swiveling mechanism 260. The delivery conveyor belt arm 300A comprises an open-ended hooked bracket which supports the delivery conveyor belt frame 250. The delivery conveyor belt arm 300A cradles the delivery conveyor belt 210 and is attached to both sides of the delivery conveyor belt frame 250 at a first end and is attached to a bottom plate 310 of the delivery conveyor belt swiveling mechanism 260 at a second end. Although the delivery conveyor belt arm 300A is welded to the bottom plate 310 in the preferred embodiment of the present invention, the delivery conveyor belt arm 300A can be attached to the bottom plate 310 in any appropriate fashion. The open-ended design of the delivery conveyor belt arm 300A provides unobstructed access for the second portion 165B of the receiving conveyor belt 165.

Referring additionally now to FIG. 3B, there is illustrated a frontal perspective of a second embodiment of a delivery conveyor belt arm 300B and the delivery conveyor belt swiveling mechanism 260. Unlike the delivery conveyor belt arm 300A of the first embodiment, the conveyor belt arm 300B of the second embodiment does not include an open-ended hooked bracket but instead is simply attached to the delivery conveyor belt frame 250 at a first end and is attached to the bottom plate 310 of the delivery conveyor belt swiveling mechanism 260 at a second end. As with the first embodiment, although the delivery conveyor belt arm 300B is welded to the bottom plate 310 in the preferred embodiment of the present invention, the delivery conveyor belt arm 300B can be attached to the bottom plate 310 in any appropriate fashion. The open-ended design of the delivery conveyor belt arm 300B also provides unobstructed access for the second portion 165B of the receiving conveyor belt 165.

Using either embodiment, the delivery conveyor belt arm 300 extends through the bottom plate 310 and further extends through and above a top plate 320. The delivery conveyor belt arm 300 is freely rotatable about the top plate 320 and is prevented from slipping back down through the top plate 320 by a restrainer 330. The top plate 320 is fixedly attached to the chassis 130 and supports the swiveling mechanism 260, the conveyor belt arm 300 and the delivery conveyor belt 210. The top plate 320 can be attached to the chassis 130 in any manner, and depending on the particular attachment, may require cutting away a portion of the chassis 130 to provide space for the conveyor belt arm 300 and the restrainer 330 located above the top plate 320.

Figure 4:
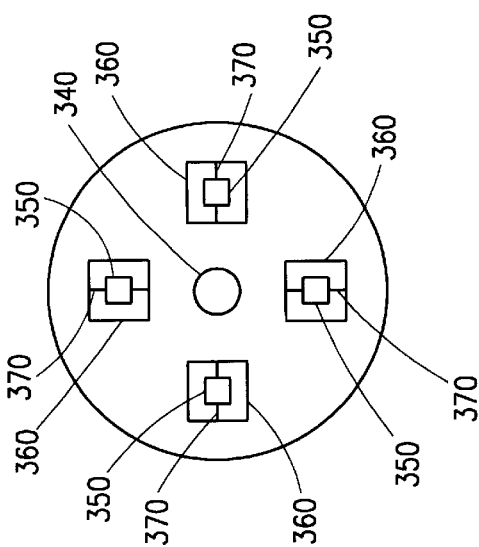
FIG. 4 is a bottom perspective of a top plate of the swiveling mechanism.

Referring additionally now to FIG. 4, there is illustrated a bottom of the top plate 320 of the swiveling mechanism 260. The top plate 320 includes a center opening 340 through which passes the delivery conveyor belt arm 300. The delivery conveyor belt arm 300 is not attached to the top plate 320 and freely rotates in the center opening 340 of the top plate 320. The top plate 320 further includes a plurality of rollers 350 inserted into notches 360 in the top plate 320 and attached to the top plate 320 by axles 370. The plurality of rollers 350 rest against the bottom plate 310 and allow the bottom plate 310 and the conveyor belt arm 300 to freely rotate about the top plate 320. The structural combination of the bottom plate 310, top plate 320 and the rollers 350 allow stresses created by the weight of the swinging conveyor belt 210 and the paving material to be transferred from the conveyor belt arm 300 to the chassis 130. In an alternative embodiment, the rollers 350 are replaced with a plurality of ball bearings or similarly rotating structure.

Figure 5:
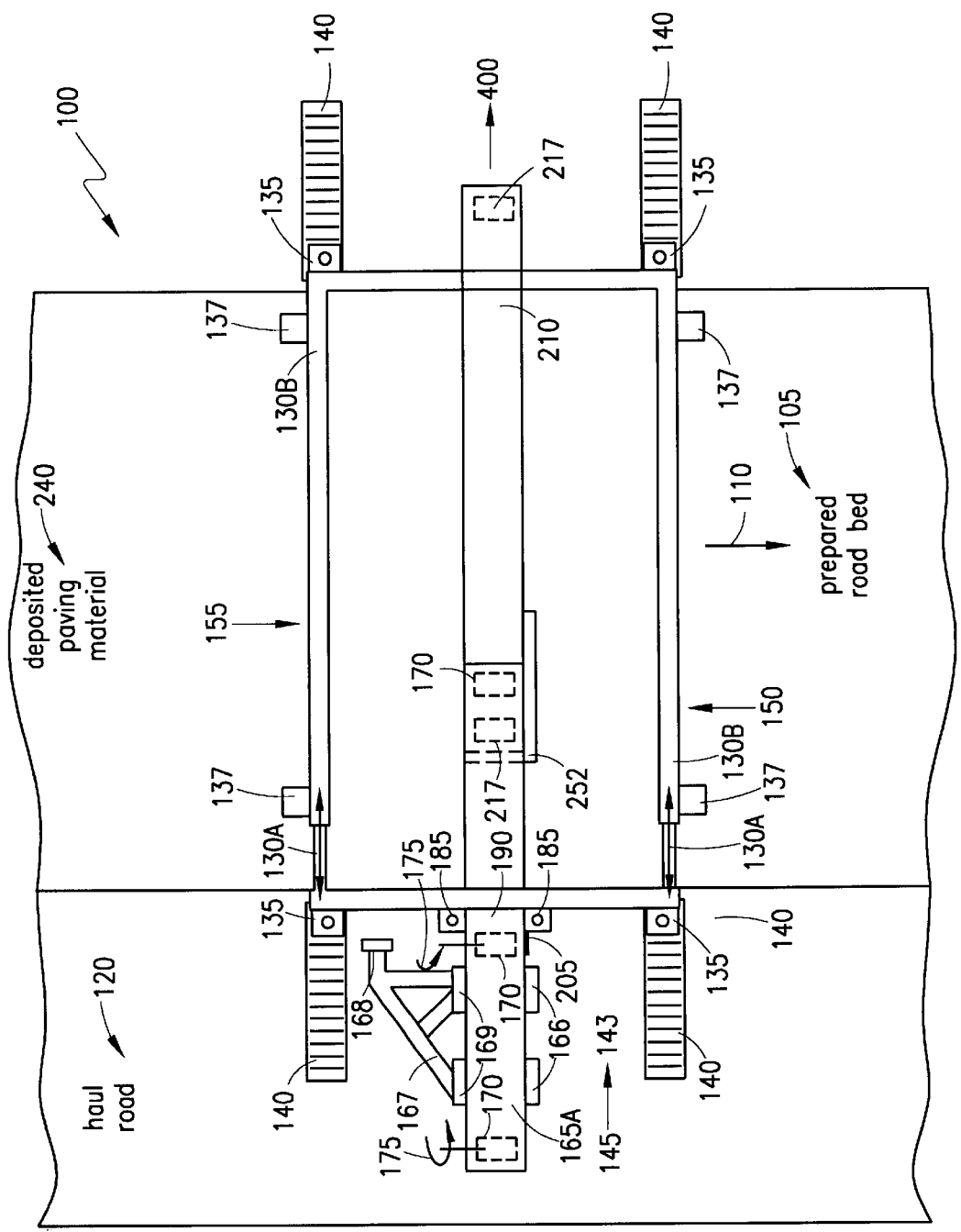
FIG. 5 is a top perspective of a schematic representation of the present invention with all four tracks rotated ninety degrees.

Referring additionally now to FIG. 5, there is illustrated a top perspective of a schematic representation of the present invention with all four tracks 140 rotated ninety degrees. As previously described, each of the four support cylinders 135 are attached to one of four separate tracks 140 mounted on track frames via four track swiveling mechanisms 142. The four tracks 140 are used to propel the spreader 100 both forward, in the paving direction as indicated by arrow 110, and backward, in a direction opposite to arrow 110. Using the support cylinders 135 and the track swiveling mechanisms 142, each of the four tracks 140 can be swiveled up to ninety degrees to travel left and right in a direction perpendicular to the paving direction as depicted by arrows 400. It is also rioted that the delivery conveyor belt 210 has been swung to face out the right side of the chassis. When in the configuration as depicted in FIG. 5, the spreader 100 can be driven up and onto or down and off a trailer used to transport the spreader 100. To rotate the tracks 140 and swing the delivery conveyor belt 210 to the side of the spreader 100, the rear right track 140 is lifted off the ground using the associated support cylinder 135 with the three remaining tracks 140 supporting the spreader 100 off the ground. The delivery conveyor belt 210 is then swung to the side of the spreader 100 and the right rear track 140 is rotated ninety degrees and lowered to the ground. Subsequently, each of the three remaining tracks 140 are individually rotated ninety degrees in a similar fashion. Alternatively, the four hydraulic rams 137 can be used in conjunction with the swiveling mechanisms 142 to perform the rotation process.

Additionally, it can be appreciated that the delivery conveyor belt 210 can be swung one hundred and eighty degrees from an initial position at the rear side 155 of the spreader 100 to the front side 150 of the spreader to facilitate the spreading of paving materials on the front side 150 of the spreader 100.

Although the preferred embodiments of the apparatus and method of the present invention have been illustrated in the accompanying Drawings and described in the foregoing Detailed Description, it is understood that the invention is not limited to the embodiments disclosed, but is capable of numerous rearrangements, modifications and substitutions without departing from the spirit of the invention as set forth and defined by the following claims. Furthermore, certain components including various spreader systems and structures have been left out of the drawings for purposes of clarity. Nevertheless, it is understood that the design, construction and operation of these components are well know to one of ordinary skill in the art.

What is claimed is:

1. A paving material spreader comprising:

a chassis forming a support structure for the spreader, the chassis having a front side facing toward a paving direction, a rear side opposite the front side, a receiving side facing toward a haul road and a far side opposite the receiving side;

a receiving conveyor belt extending out past the receiving side of the spreader and running to a central point beneath the chassis, the receiving conveyor belt for receiving paving materials from delivery trucks and transporting the paving materials to the central point where the paving materials fall off the receiving conveyor belt;

a swinging delivery conveyor belt having a first end located at the central point beneath the receiving conveyor belt, the delivery conveyor belt extending beyond the rear side of the chassis to a second end of the receiving conveyor belt, the delivery conveyor belt for receiving paving materials falling off the receiving conveyor belt and transporting the paving materials to the second end of the conveyor belt where the paving materials are spread behind the spreader;

a delivery conveyor belt frame for supporting the delivery conveyor belt;

a swiveling mechanism for rotating the first end of the delivery conveyor belt in a horizontal plane about a vertical axis located at the central point so as to swing the second end of the delivery conveyor belt behind the spreader; and a delivery conveyor belt support structure for supporting the delivery conveyor belt frame from the swiveling mechanism, wherein the delivery conveyor belt support structure comprises an open-ended delivery conveyor belt arm, the delivery conveyor belt arm including a first end attached to the first end of the delivery conveyor belt and a second end attached to the swiveling mechanism; and wherein said delivery conveyor belt frame is attached to said open-ended delivery conveyor belt arm.

2. The spreader, as recited in claim 1, further comprising:

a plurality of means for propelling the spreader; and means for raising off the ground at least one of said means for propelling;

wherein said swiveling mechanism is operable to rotate the second end of the delivery conveyor belt from the rear side to the far side beneath at least one of said means for propelling raised by said means for raising.

3. The paving material spreader, as recited in claim 1, wherein the delivery conveyor belt arm is hook shaped such that the first end of the delivery conveyor belt arm cradles the first end of the delivery conveyor belt.

4. The paving material spreader, as recited in claim 1, furthering comprising at least one boom for providing additional support to the delivery conveyor belt, the boom having a first end rotatably attached to the chassis and a second end attached to the delivery conveyor belt frame.

5. The paving material spreader, as recited in claim 1, wherein the swiveling mechanism comprises:

a bottom plate having a center opening for allowing passage of the delivery conveyor belt arm, the delivery conveyor belt arm fixedly attached to the bottom plate;

a top plate having a center opening for allowing passage of the delivery conveyor belt arm, the delivery conveyor belt arm freely rotatable in the center opening of the top plate;

a restrainer attached to the second end of the delivery conveyor belt arm above the top plate, the restrainer for preventing the second end of the delivery conveyor belt arm from sliding through the center opening of the top plate; and a rotator for effectuating rotation between the bottom plate and the top plate.

6. The paving material spreader, as recited in claim 5, wherein the rotator comprises a plurality of rollers.

7. The paving material spreader, as recited in claim 5, wherein the rotator comprises a plurality of ball bearings.

8. The paving material spreader, as recited in claim 5, further comprising a hopper attached to the first end of the delivery conveyor belt frame for directing paving materials falling off the receiving conveyor belt onto the first end of the delivery conveyor belt.

9. The paving material spreader, as recited in claim 5, further comprising a receiving conveyor belt elevator for raising and lowering the receiving conveyor belt.

10. The paving material spreader, as recited in claim 9, wherein the receiving conveyor belt elevator comprises at least one hydraulic piston.

11. The paving material spreader, as recited in claim 5, wherein the chassis comprises:

a first telescoping portion; and a second telescoping portion, the first telescoping portion and the second telescoping portion laterally moveable with respect to each other toward the receiving side and the far side for enlarging and reducing the chassis width.

12. The paving material spreader, as recited in claim 5, further comprising:

a receiving conveyor belt hinge which partitions the receiving conveyor belt into a first portion extending out beyond the receiving side of the chassis and a second portion extending from the first portion to the central point located beneath the chassis, the hinge for effectuating the raising of the first portion of the receiving conveyor belt from a horizontal position to an upright position; and a raising mechanism for raising the first portion of the receiving conveyor belt.

13. The paving material spreader, as recited in claim 12, wherein the rasing mechanism is a hydraulic piston attached to the first portion of the receiving conveyor belt and to the chassis.

14. The paving material spreader, as recited in claim 12, further comprising:

an angle brace located behind a rear side of the first portion of the receiving conveyor belt for transferring torsional forces exerted on the receiving conveyor belt to the chassis as the spreader pushes a delivery truck;

at least one hinge attached to the angle brace and to the rear side of the first portion of the receiving conveyor belt, the hinge for swinging the angle brace to an upright position; and at least one roller attached to a front side of the first portion of the receiving conveyor belt, the roller for making contact with tires of the delivery truck and rotating with the delivery truck tires as the delivery truck is pushed by the spreader.

15. The paving material spreader, as recited in claim 14, further comprising an angle brace roller attached to the angle brace for making contact between the angle brace and the chassis and further for effectuating the transfer of the torsional forces from the angle brace to the chassis.

16. The paving material spreader, as recited in claim 15, wherein the angle brace roller makes contact with a track frame attached to the chassis thereby transferring the torsional forces to the chassis via the track frame.

17. The paving material spreader, as recited in claim 5, further comprising:

a plurality of tracks for propelling the spreader;

a plurality of track swivel mechanisms associated with the plurality of tracks, the track swivel mechanisms for rotating the plurality of tracks to effectuate the propulsion of the spreader in a forward and a reverse direction when the plurality of tracks are in a first rotational position and further to effectuate the propulsion of the spreader in a left and a right direction when the plurality of tracks are in a second rotational position; and a plurality of support cylinders associated with the plurality of tracks for mounting the plurality of tracks and plurality of track swivel mechanisms to the chassis, the plurality of support cylinders further for effectuating the independent raising and lowering of each of the plurality of tracks.

18. A paving material spreader comprising:

a chassis forming a support structure for the spreader;

a receiving conveyor belt extending out past a side of the spreader and running to a central point beneath the chassis, the receiving conveyor belt for receiving paving materials from delivery trucks and transporting the paving materials to the central point where the paving materials fall off the receiving conveyor belt;

a delivery conveyor belt having a first end located at the central point beneath the receiving conveyor belt, the delivery conveyor belt for receiving paving materials falling off the receiving conveyor belt and transporting the paving materials to a second end of the conveyor belt where the paving materials are spread across a roadbed;

a delivery conveyor belt frame for supporting the delivery conveyor belt;

a plurality of tracks for propelling the spreader;

a plurality of track swivel mechanisms associated with the plurality of tracks, the track swivel mechanisms for rotating the plurality of tracks to effectuate the propulsion of the spreader in a forward and a reverse direction when the plurality of tracks are in a first rotational position and to further effectuate the propulsion of the spreader in a left and a right direction when the plurality of tracks are in a second rotational position;

a plurality of support cylinders associated with the plurality of tracks for mounting the plurality of tracks and plurality of track swivel mechanisms to the chassis, the plurality of support cylinders further for effectuating the independent raising and lowering of each of the plurality of tracks;

a receiving conveyor belt hinge which partitions the receiving conveyor belt into a first portion extending out beyond a receiving side of the chassis and a second portion extending from the first portion to the central point located beneath the chassis, the hinge for effectuating the raising of the first portion of the receiving conveyor belt from a horizontal position to an upright position; and a raising mechanism for raising the first portion of the receiving conveyor belt.

19. The paving material spreader, as recited in claim 18, said chassis having a width extending laterally across the roadbed, said chassis comprising:

a first telescoping portion on a first side of the roadbed; and a second telescoping portion on a second side of the roadbed, the first telescoping portion and the second telescoping portion laterally moveable with respect to each other for reducing the width of the chassis.

20. The paving material spreader, as recited in claim 18, further comprising:

an angle brace located behind a rear side of the first portion of the receiving conveyor belt for transferring torsional forces exerted on the receiving conveyor belt to the chassis as the spreader pushes a delivery truck;

at least one hinge attached to the angle brace and to the rear side of the first portion of the receiving conveyor belt, the hinge for swinging the angle brace to an upright position;

at least one roller attached to a front side of the first portion of the receiving conveyor belt, the roller for making contact with tires of the delivery truck and rotating with the delivery truck tires as the delivery truck is pushed by the spreader; and an angle brace roller attached to the angle brace for making contact between the angle brace and the chassis and further for effectuating the transfer of the torsional forces from the angle brace to the chassis.

21. The paving material spreader, as recited in claim 20, wherein the angle brace roller makes contact with a track frame attached to the chassis thereby transferring the torsional forces to the chassis via the track frame.

22. A paving material spreader comprising:

a chassis forming a support structure for the spreader;

a receiving conveyor belt extending out past a side of the spreader and running to a central point beneath the chassis, the receiving conveyor belt for receiving paving materials from delivery trucks and transporting the paving materials to the central point where the paving materials fall off the receiving conveyor belt;

a delivery conveyor belt having a first end located at the central point beneath the receiving conveyor belt, the delivery conveyor belt for receiving paving materials falling off the receiving conveyor belt and transporting the paving materials to a second end of the conveyor belt where the paving materials are spread across a roadbed;

a delivery conveyor belt frame for supporting the delivery conveyor belt;

a receiving conveyor belt hinge which partitions the receiving conveyor belt into a first portion extending out beyond the receiving side of the chassis and a second portion extending from the first portion to the central point located beneath the chassis, the hinge for effectuating the raising of the first portion of the receiving conveyor belt from a horizontal position to an upright position; and a raising mechanism for raising the first portion of the receiving conveyor belt.

23. The paving material spreader, as recited in claim 22, further comprising:

an angle brace located behind a rear side of the first portion of the receiving conveyor belt for transferring torsional forces exerted on the receiving conveyor belt to the chassis as the spreader pushes a delivery truck;

at least one hinge attached to the angle brace and to the rear side of the first portion of the receiving conveyor belt, the hinge for swinging the angle brace to an upright position;

at least one roller attached to a front side of the first portion of the receiving conveyor belt, the roller for making contact with tires of the delivery truck and rotating with the delivery truck tires as the delivery truck is pushed by the spreader; and an angle brace roller attached to the angle brace for making contact between the angle brace and the chassis and further for effectuating the transfer of the torsional forces from the angle brace to the chassis.

24. The paving material spreader, as recited in claim 23, wherein the angle brace roller makes contact with a track frame attached to the chassis thereby transferring the torsional forces to the chassis via the track frame.

25. The paving material spreader, as recited in claim 22, said chassis having a width extending laterally across the roadbed, said chassis comprising:

a first telescoping portion on a first side of the roadbed; and a second telescoping portion on a second side of the roadbed, the first telescoping portion and the second telescoping portion laterally moveable with respect to each other for reducing the width of the chassis.

26. The paving material spreader, as recited in claim 25, wherein said delivery conveyor belt frame is connected to said chassis at the central point and said first and second telescoping portions are laterally moveable with respect to each other while said delivery conveyor belt frame remains connected to said chassis at the central point.

27. The paving material spreader, as recited in claim 22, wherein said spreader is self-propelled.

28. The paving material spreader, as recited in claim 22, wherein the delivery conveyor belt's second end swings about the delivery conveyor belt's first end.

29. A method for spreading paving materials across a roadbed comprising the steps of:

depositing the paving materials onto a receiving conveyor belt;

conveying the paving materials to a central point beneath a spreader chassis;

depositing the paving materials onto a delivery conveyor belt which extends from the central point out past a rear side of the chassis;

conveying the paving materials to a point located behind the spreader chassis;

depositing the paving materials onto the roadbed; and swinging the delivery conveyor belt across the roadbed as the paving materials are deposited onto the roadbed.

30. The method, as recited in claim 29, further comprising the step of propelling the chassis forward.

31. The method, as recited in claim 30, further comprising the step of raising or lowering the chassis in response to changes in elevation of a haul road or elevation of the roadbed.

32. The method, as recited in claim 30, further comprising the step of raising or lowering the receiving conveyor belt in response to changes in elevation of the haul road or elevation of the delivery truck.

33. The method, as recited in claim 30, further comprising the steps of:

raising the receiving conveyor belt to an upright position to allow a delivery truck to travel along side of the spreader to a position in front of the receiving conveyor belt; and lowering the receiving conveyor belt to a horizontal position.

34. The method, as recited in claim 33, further comprising the step of adjusting a height of the receiving conveyor belt in response to an elevation of the haul road and a height of the delivery truck.

35. The method, as recited in claim 34, further comprising the step of pushing the delivery truck forward as the chassis is propelled forward.

36. The method, as recited in claim 30, said propelling step is carried out by a plurality of tracks associated with said spreader chassis, wherein said step of depositing the paving materials onto a receiving conveyor belt is carried out along a haul road.

37. The method, as recited in claim 29, further comprising the step of adjusting the spreader chassis width to accommodate the roadbed width.

38. The method, as recited in claim 37, further comprising carrying out said adjusting step while said delivery conveyor belt remains extended from the central point.

39. A paving material spreader comprising:

a chassis forming a support structure for the spreader;

front and rear ends;

a receiving side;

a far side opposing the receiving side;

a receiving conveyor belt extending out past the receiving side and running to a central point beneath the chassis, the receiving conveyor bell for receiving paving materials from delivery trucks and transporting the paving materials to the central point where the paving materials fall off the receiving conveyor belt;

a delivery conveyor belt having a first end located at the central point beneath the receiving conveyor belt, the delivery conveyor belt for receiving paving materials falling off the receiving conveyor belt and transporting the paving materials to a second end of the conveyor belt where the paving materials are spread across a roadbed;

a swiveling mechanism for rotating the first end of the delivery conveyor belt about a substantially vertical axis located at the central point;

wherein said swiveling mechanism permits swinging the second end of the delivery conveyor belt above the roadbed to deposit paving material on the roadbed, and permits swinging the second end of the delivery conveyor belt from one of the ends to the far side;

a plurality of tracks for propelling the spreader;

a plurality of track swivel mechanisms associated with the plurality of tracks, the track swivel mechanisms for rotating the plurality of tracks to effectuate the propulsion of the spreader in a direction of the front and rear ends when the plurality of tracks are in a first rotational position and to further effectuate the propulsion of the spreader in a direction of the sides, perpendicular to the direction of the front and rear ends, when the plurality of tracks are in a second rotational position;

a receiving conveyor belt hinge which partitions the receiving conveyor belt into a first portion extending out beyond the receiving side of the chassis and a second portion extending from the first portion to the central point located beneath the chassis, the hinge for effectuating the raising of the first portion of the receiving conveyor belt from a horizontal position to an upright position; and a raising mechanism for raising the first portion of the receiving conveyor belt.

40. A paving material spreader comprising:

a chassis forming a support structure for the spreader;

front and rear ends;

a receiving side;

a far side opposing the receiving side;

a receiving conveyor belt extending out past the receiving side and running to a central point beneath the chassis, the receiving conveyor belt for receiving paving materials from delivery trucks and transporting the paving materials to the central point where the paving materials fall off the receiving conveyor belt;

a delivery conveyor belt having a first end located at the central point beneath the receiving conveyor belt, the delivery conveyor belt for receiving paving materials falling off the receiving conveyor belt and transporting the paving materials to a second end of the conveyor belt where the paving materials are spread across a roadbed;

a swiveling mechanism for rotating the first end of the delivery conveyor belt about a substantially vertical axis located at the central point;

wherein said swiveling mechanism permits swinging the second end of the delivery conveyor belt above the roadbed to deposit paving material on the roadbed, and permits swinging the second end of the delivery conveyor belt from one of the ends to the far side;

a plurality of tracks for propelling the spreader;

a plurality of track swivel mechanisms associated with the plurality of tracks, the track swivel mechanisms for rotating the plurality of tracks to effectuate the propulsion of the spreader in a direction of the front and rear ends when the plurality of tracks are in a first rotational position and to further effectuate the propulsion of the spreader in a direction of the sides, perpendicular to the direction of the front and rear ends, when the plurality of tracks are in a second rotational position;

an angle brace located behind a rear side of the receiving conveyor belt for transferring torsional forces exerted on the receiving conveyor belt to the chassis as the spreader pushes a delivery truck;

at least one hinge attached to the angle brace and to the rear side of the receiving conveyor belt, the hinge for swinging the angle brace to an upright position;

at least one roller attached to a front side of the receiving conveyor belt, the roller for making contact with tires of the delivery truck and rotating with the delivery truck tires as the delivery truck is pushed by the spreader; and an angle brace roller attached to the angle brace for making contact between the angle brace and the chassis and further for effectuating the transfer of the torsional forces from the angle brace to the chassis.

41. A paving material spreader comprising:

a chassis forming a support structure for the spreader;

front and rear ends;

a receiving side;

a far side opposing the receiving side;

a receiving conveyor belt extending out past the receiving side and running to a central point beneath the chassis, the receiving conveyor belt for receiving paving materials from delivery trucks and transporting the paving materials to the central point where the paving materials fall off the receiving conveyor belt;

a delivery conveyor belt having a first end located at the central point beneath the receiving conveyor belt, the delivery conveyor belt for receiving paving materials falling off the receiving conveyor belt and transporting the paving materials to a second end of the conveyor belt where the paving materials are spread across a roadbed;

a swiveling mechanism for rotating the first end of the delivery conveyor belt about a substantially vertical axis located at the central point;

wherein said swiveling mechanism permits swinging the second end of the delivery conveyor belt above the roadbed to deposit paving material on the roadbed, and permits swinging the second end of the delivery conveyor belt from one of the ends to the far side;

a plurality of tracks for propelling the spreader;

a plurality of track swivel mechanisms associated with the plurality of tracks, the track swivel mechanisms for rotating the plurality of tracks to effectuate the propulsion of the spreader in a direction of the front and rear ends when the plurality of tracks are in a first rotational position and to further effectuate the propulsion of the spreader in a direction of the sides, perpendicular to the direction of the front and rear ends, when the plurality of tracks are in a second rotational position; and a plurality of rams extendible in a downward direction to raise all of the plurality of tracks above ground level.

42. The paving material spreader, as recited in claim 41, wherein while all of said tracks are off the ground, said swiveling mechanism permits swinging the second end of the delivery conveyor belt from one of the ends to the far side beneath one of said tracks.

43. A paving material spreader comprising:

a chassis forming a support structure for the spreader;

front and rear ends;

a receiving side;

a far side opposing the receiving side;

a receiving conveyor belt extending out past the receiving side and running to a central point beneath the chassis, the receiving conveyor belt for receiving paving materials from delivery trucks and transporting the paving materials to the central point where the paving materials fall off the receiving conveyor belt;

a delivery conveyor belt having a first end located at the central point beneath the receiving conveyor belt, the delivery conveyor belt for receiving paving materials falling off the receiving conveyor belt and transporting the paving materials to a second end of the conveyor belt where the paving materials are spread across a roadbed;

a swiveling mechanism for rotating the first end of the delivery conveyor belt about a substantially vertical axis located at the central point;

wherein said swiveling mechanism permits swinging the second end of the delivery conveyor belt above the roadbed to deposit paving material on the roadbed, and permits swinging the second end of the delivery conveyor belt from one of the ends to the far side;

a plurality of tracks for propelling the spreader;

a plurality of track swivel mechanisms associated with the plurality of tracks, the track swivel mechanisms for rotating the plurality of tracks to effectuate the propulsion of the spreader in a direction of the front and rear ends when the plurality of tracks are in a first rotational position and to further effectuate the propulsion of the spreader in a direction of the sides, perpendicular to the direction of the front and rear ends, when the plurality of tracks are in a second rotational position;

at least four tracks for propelling the spreader comprising at least two tracks on said receiving side of said chassis and at least two tracks on said far side of said chassis; and at least four support cylinders associated with the at least four tracks for mounting the tracks to the chassis, the at least four support cylinders further for effectuating the independent raising and lowering of each of the at least four tracks, wherein each of the support cylinders can lift its associated track off the ground while the remaining tracks support the spreader;

wherein while one of said tracks is lifted off the ground, said swiveling mechanism permits swinging the second end of the delivery conveyor belt from one of the ends to the far side beneath said lifted track.

44. A spreader for use on a prepared roadbed adjacent a haul road, comprising:

a chassis forming a support structure for the spreader, the chassis having two opposing sides facing the prepared roadbed, a receiving side facing toward the haul road and a far side opposite the receiving side;

a receiving conveyor belt extending out past the receiving side of the spreader and running to a central point beneath the chassis, the receiving conveyor belt for receiving paving materials from delivery trucks and transporting the paving materials to the central point where the paving materials fall off the receiving conveyor belt;

a swinging delivery conveyor belt having a first end and second end, said first end located below the central point beneath the receiving conveyor belt, the delivery conveyor belt rotatable about the central point to extend the second end of the delivery conveyor belt selectively beyond either of the opposing sides facing the prepared roadbed, the delivery conveyor belt for receiving paving materials falling off the receiving conveyor belt and transporting the paving materials to the second end of the conveyor belt where the paving materials are deposited on the prepared roadbed;

a delivery conveyor belt frame for supporting the delivery conveyor belt;

a swiveling mechanism for rotating the first end of the delivery conveyor belt in a horizontal plane about a vertical axis located at the central point so as to swing the second end of the delivery conveyor belt; and a delivery conveyor belt support structure for supporting the delivery conveyor belt frame from the swiveling mechanism.

45. The spreader, as recited in claim 44, the delivery conveyor belt support structure comprising a bracket, the bracket including a first end attached to the first end of the delivery conveyor belt and a second end to the chassis at the centrally located point below the chassis.

46. The spreader, as recited in claim 45, wherein the bracket is hook-shaped such that the first end of the bracket cradles the first end of the delivery conveyor belt.

47. The spreader, as recited in claim 44, the delivery conveyor belt support structure comprising a bracket, the bracket including a first end supporting the first end of the delivery conveyor belt and a second end supported by the swiveling mechanism;

wherein the swiveling mechanism comprises:

a bottom plate having a center opening for allowing passage of the second end of the bracket, the bracket fixedly attached to the bottom plate;

a top plate having a center opening for allowing passage of the bracket, the bracket freely rotatable in the center opening of the top plate;

a restrainer attached to the second end of the bracket above the top plate, the restrainer for preventing the second end of the bracket from sliding through the center opening of the top plate; and a rotator for effectuating rotation between the bottom plate and the top plate.

48. The spreader, as recited in claim 44, further comprising:

a receiving conveyor belt hinge which partitions the receiving conveyor belt into a first portion extending out beyond the receiving side of the chassis and a second portion extending from the first portion to the central point located beneath the chassis, the hinge for effectuating the raising of the first portion of the receiving conveyor belt from a horizontal position to an upright position; and a raising mechanism for raising the first portion of the receiving conveyor belt, wherein said spreader is self-propelled.

49. The spreader, as recited in claim 48, further comprising:

an angle brace located behind a rear side of the first portion of the receiving conveyor belt for transferring torsional forces exerted on the receiving conveyor belt to the chassis as the spreader pushes a delivery truck;

at least one hinge attached to the angle brace and to the rear side of the first portion of the receiving conveyor belt, the hinge for swinging the angle brace to an upright position; and at least one roller attached to a front side of the first portion of the receiving conveyor belt, the roller for making contact with tires of the delivery truck and rotating with the delivery truck tires as the delivery truck is pushed by the spreader.

50. The spreader, as recited in claim 44, said roadbed having a width and opposing sides, said chassis comprising:

first and second telescoping portions, wherein said telescoping portions are situated on opposing sides of the roadbed, and said telescoping portions are laterally moveable with respect to each other for adjusting the chassis width to accommodate the roadbed width.

51. The spreader, as recited in claim 44, wherein said swiveling mechanism is operable to rotate the second end of the delivery conveyor belt from one of said sides facing the prepared roadbed to the far side.

52. The spreader, as recited in claim 51, further comprising:

at least four tracks for propelling the spreader comprising at least two tracks on said receiving side of said chassis and at least two tracks on said far side of said chassis; and at least four support cylinders mounted on the chassis;

wherein each of said support cylinders is associated with one of said tracks for effectuating the independent raising and lowering of each of the said at least four tracks, and the second end of the delivery conveyor belt rotates from one of said sides facing the prepared roadbed to the far side, and said delivery conveyor belt rotates beneath one of said tracks on said far side of said chassis when one of said tracks is raised.

53. The spreader, as recited in claim 51, further comprising:

a plurality of tracks for propelling the spreader; and a plurality of rams extendible in a downward direction to raise all of the plurality of tracks above ground level, wherein the second end of the delivery conveyor belt rotates from one of said sides facing the prepared roadbed to the far side, and said delivery conveyor belt rotates beneath one of said tracks when all of said tracks are raised.

54. The spreader, as recited in claim 44, further comprising:

a plurality of means for propelling the spreader; and means for raising off the ground at least one of said means for propelling;

wherein said swiveling mechanism is operable to rotate the second end of the delivery conveyor belt from either side facing the prepared roadbed to the far side beneath at least one of said means for propelling raised by said means for raising.

* * * * *